United States Patent
Lampin et al.

(10) Patent No.: US 7,415,033 B2
(45) Date of Patent: Aug. 19, 2008

(54) DYNAMIC TIME DIVISION MULTIPLEXING CIRCUIT WITHOUT A SHADOW TABLE

(75) Inventors: Patrick Lampin, Fontainebleau (FR); Catherine Godefroy, Evry (FR); Bernard Desrosiers, Boisssise le Roi (FR); Yves Langlois, Essonnes (FR)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 10/605,049

(22) Filed: Sep. 4, 2003

(65) Prior Publication Data
US 2005/0053027 A1    Mar. 10, 2005

(30) Foreign Application Priority Data
Dec. 19, 2002    (EP)    ................................... 02368140

(51) Int. Cl.
*H04B 7/212*    (2006.01)
(52) U.S. Cl. .................. 370/459; 370/321; 370/327; 370/442
(58) Field of Classification Search ................ 370/437, 370/442, 458–459, 461, 462, 468, 443, 444, 370/321, 337, 345, 347–348; 710/117, 124
See application file for complete search history.

(56) References Cited

U.S. PATENT DOCUMENTS

| | | | |
|---|---|---|---|
| 6,327,259 B1 * | 12/2001 | Chiu et al. | 370/375 |
| 6,895,016 B1 * | 5/2005 | Nguyen et al. | 370/437 |
| 7,042,895 B1 * | 5/2006 | Nguyen et al. | 370/442 |
| 2002/0067709 A1 * | 6/2002 | Yamada et al. | 370/442 |

* cited by examiner

*Primary Examiner*—Ricky Ngo
*Assistant Examiner*—Pao Sinkantarakorn
(74) *Attorney, Agent, or Firm*—Steven Capella

(57) ABSTRACT

In a telecommunication system adapted to exchange n-bit frames according to a dynamic time division multiplexing access method for a maximum of N accessible channels, the use of a shadow time slot assignment table is eliminated by use of a circuit that includes (a) an n×p memory block to store a time slot assignment table which describes the different time slot assignments by specifying which logical channel each bit position of an n-bit frame belongs to, (b) a register having N fields with a granularity of one bit, each bit indicates the status of the corresponding logical channel associated thereto, and (c) a logic circuit connected to the memory block and register that enables or disables the transmission of the logical channel identifier to a time slot assignor depending on the status bit value.

1 Claim, 3 Drawing Sheets

US 7,415,033 B2

DYNAMIC TIME DIVISION MULTIPLEXING CIRCUIT WITHOUT A SHADOW TABLE

BACKGROUND OF INVENTION

The present invention relates to high speed telecommunication systems and more particularly to an improved dynamic time division multiplexing circuit wherein the shadow table which is memory space consuming is no longer required.

In telecommunication systems split in several subsystems where data are transmitted on a common media they share, the dynamic Time Division Multiplexing (TDM) access method is extensively used to exchange data between said subsystems. The TDM access method consists in splitting the time in time slots, each one corresponding to a logical channel, i.e., a connection between two subsystems. These logical channels, however, have different data throughputs and are only sporadically active, so that the time slot assignment must be dynamically performed via the use of programmable memories.

FIGS. 1a and 1b illustrate the fundamentals of the TDM access method. In FIG. 1a, there are shown six subsystems, labeled A to F, that exchange information via a bi-directional common media 10 (e.g., two transmission wires) at different times. For instance, the double arrow that links subsystems A and C illustrates a connection corresponding to a logical channel for full duplex data transmission there between at a given time and for a determined duration (to subsequently allow the other pairs of subsystems to communicate between themselves as suggested by the other double arrows). The maximum number of possible bi-directional logical connections is given by factorial 5 (5!), i.e., 120. In fact, the number of logical connections that is required in reality is much limited. Three double arrows are represented to illustrate full duplex connections only between subsystems A-C, B-E and D-F.

FIG. 1b shows an example of the assignment of the eight data bit positions labeled Bit1 to Bit8 (and more generally of n bit positions) of a TDM frame to three different logical channels X, Y and Z at a given time. These three logical channels (distinguished one from the another by their respective identifier: LC X, LC Y and LC Z) correspond to the full duplex connections between subsystems A-C, B-E and D-F in the example mentioned above. More generally, these identifiers can be understood as represented by a number coded on p bits, associated to any logical channel/connection between two subsystems. Two bit positions (Bit1-Bit2) are assigned to LC X, four bit positions (Bit3-Bit4-Bit5-Bit6) to LC Y and finally, two bit positions (Bit7-Bit8) to LC Z. This assignment thus defines the corresponding time allocation for each logical channel, three time slots in this example, labeled TimeslotX, TimeslotY and TimeslotZ respectively. A Time Slot Assignment (TSA) table 11 (describing the different time slots by specifying which logical channel each data bit position belongs to) can be then set up. Therefore, in the above described example wherein the 8-bit TDM frame is composed of three time slots of different sizes, the common media 10 that transports the serial data bits can be seen as composed of three logical channels of different throughputs (the throughput being proportional to the number of data bits). Because the content of the TSA table is time-dependent, the logical channel that is assigned to each of the TDM frame data bit position is variable. The data bits that fill the eight positions for each TDM frame are stored in dedicated First-In First-Out (FIFO) memories, each FIFO storing the data bits belonging to a determined logical channel. In other words, the content of each data bit position in the data stream transported on the common media 10 is determined by the logical channel assigned thereto, and this assignment dynamically changes.

A conventional technique of the prior art consists of providing a dynamic time slot assignment wherein two TSA tables are used at a given time, one being the active and the other the shadow table. While the active table is exploited by the time slot assignor, the shadow table may be updated by the application software to describe a new time slot assignment. Next, when appropriate, the tables are then swapped so that the shadow table is used as the active one and vice versa. FIG. 2 illustrates a standard dynamic time division multiplexing circuit 20 that implements such a conventional approach.

In FIG. 2, the active TSA table stored in memory block 21-1 contains a determined set of logical channel identifiers, e.g., LC X, LC Y and LC Z to remain consistent with the example described above by reference to FIG. 1b, while the shadow TSA table stored in memory block 21-2 contains another set thereof. The zero ("0") value means that the corresponding data bit is not assigned to any logical channel. Each memory block has n fields. The two TSA tables stored in memory blocks 21-1 and 21-2 can be swapped, written, and read by a computer (or a microprocessor) under the control of an adequate application software as standard. These operations are performed through demultiplexer 22 which interfaces the computer and the memory blocks 21-1/21-2 via bi-directional buses 23 and 24a/24b respectively. Memory blocks 21-1 and 21-2 are connected to multiplexer 25 via buses 26a and 26b respectively, and in turn, multiplexer 25 is connected to the time slot assignor 27 via output bus 28. The time slot assignor 27 basically consists of a multiplexer driven by output bus 28, namely, the content of memory blocks 21-1 and 21-2 (only one can be accessed for a read operation at a given time) and a counter (not shown). The multiplexer is fed by a plurality of FIFOs and its output is the common media 10. The role of the time assignor 27 is to control the transmission of data bits on the common media 10 or the reception of data bits to load the FIFOs.

Assuming the TSA table stored in memory block 21-1 is made active and is exploited by the time slot assignor, the other one, stored in memory block 21-2, becomes the shadow TSA table and can be updated by the computer. While the time slot assignor reads the active TSA table to get the current time slot assignment (via the data path illustrated by gray arrow 29a), the computer edits the shadow TSA table for data updating (via the data path illustrated by double gray arrow 29b). The role of the computer is not to select which TSA table must be active, but rather to determine the time when a swapping operation is necessary. In case of full duplex serial transmission, two circuits 20 are necessary in reality; the first circuit controls the transmission of data bits from the FIFOs to the common media 10 for subsequent processing, and the second one controls the selective loading of data bits transported on the common media 10 in their respective FIFOs.

This approach is very flexible as it allows any kind of modification between the old and new time slot assignments, but it has the important drawback to require two memory blocks, typically SRAMs, to store the TSA tables which may be very large, consuming thereby a huge memory space therein. To date, it is classic to transmit data bits at 8.0192 Mbit/s, within a 125 μs time frame. In this case, a pattern is comprised of n=1024 bits (instead of 8 bits in the above example depicted in FIG. 1b), and thus two TSA tables, each one with 1024 entries, are required. On the other hand, in a typical application to telephony, it is also standard practice to have up to N=256 logical channels sharing the same common media 10, so that p=8 bits are required per logical channel to code its identifier. In such case, the memory space that is required to store either active or shadow TSA table would be n×p bits, i.e., 1024×8 bits.

The above described approach which basically requires two SRAM memory blocks, one demultiplexer circuit and one multiplexer circuit. Thus, there is a desire for a much more efficient approach which decreases the amount of memory space that is required, and/or obviates the use of said demultiplexer/multiplexer circuits.

SUMMARY OF INVENTION

The invention provides an improved dynamic time division multiplexing (TDM) circuit wherein the SRAM memory block storing the shadow table is no longer required and is replaced by simple register for a significant saving of the memory space.

In another aspect, the invention provides an improved dynamic time division multiplexing circuit wherein the need of demultiplexer/multiplexer circuits is obviated for circuit design simplification and silicon space savings when the TDM circuit is integrated in a silicon chip.

The invention encompasses an improved dynamic time division multiplexing circuit to be inserted in a telecommunication system split in a plurality of subsystems adapted to exchange serial data bits therebetween. The serial data bits are arranged in n-bit frames according to the dynamic time division multiplexing (TDM) access method wherein the time is split in time slots, so that to each bit position of the frame is associated either one among N logical channels or a null value wherein N is the maximum number of logical channels that can be simultaneously opened. In addition, an identifier coded on p bits is associated with each logical channel.

The improved circuit first comprises first data storage means comprising a n×p memory block to store the time slot assignment (TSA) table which specifies for each bit position of the n-bit frame, the logical channel it belongs to at a given time, describing thereby the different time slots and second data storage means comprising a N×1 register to store status bits that indicates for each logical channel its status, "assigned" when it has a first value or "unassigned" when it has another value. The first and second data storage means are connected to input bus means for inputting the logical channel identifiers into the first data storage means and the value of the status bits in the second data storage means from a computer or an application software. Finally, it further comprises logic circuit means connected to the first and second data storage means that enables or disables the transmission of the logical channel identifiers depending upon whether they are "assigned" or "unassigned" to an output bus means for subsequent processing by a time slot assignor.

These and other aspects of the invention are described in further detail below.

DETAILED DESCRIPTION

Figure 1A:
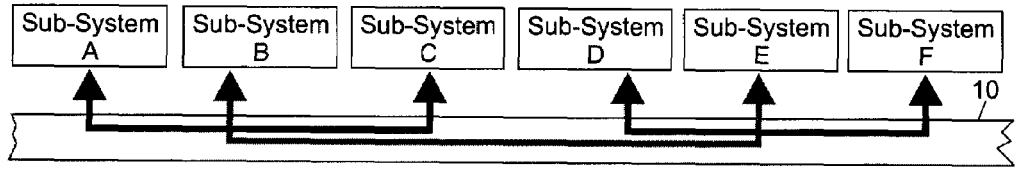
FIG. 1a shows a plurality of subsystems sharing a bi-directional common media that is used to provide the physical support for full duplex data exchange between three determined pairs thereof for a given bit frame/pattern.
Figure 1B:
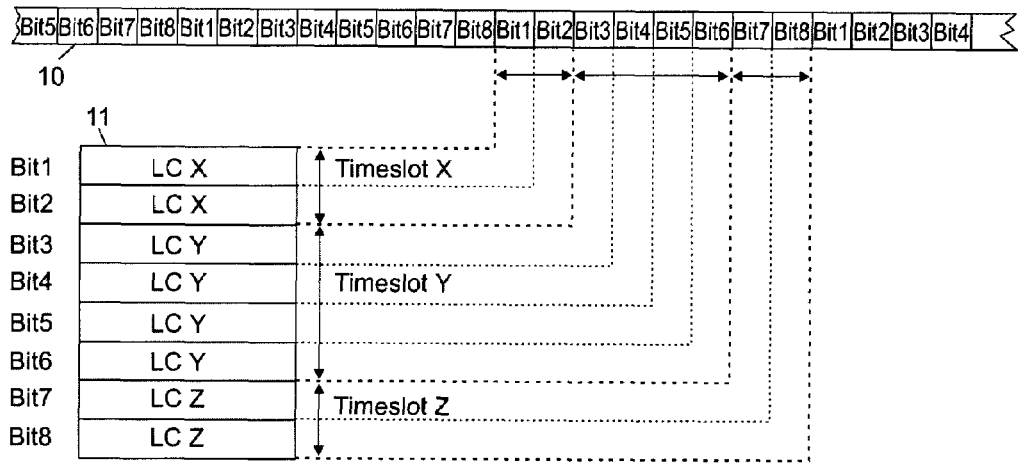
FIG. 1b schematically shows a Time Slot Assignment (TSA) table which describes the different time slots by specifying which logical channel/connection each bit of the pattern belongs to, according to the dynamic Time Division Multiplexing (TDM) access method.
Figure 2:
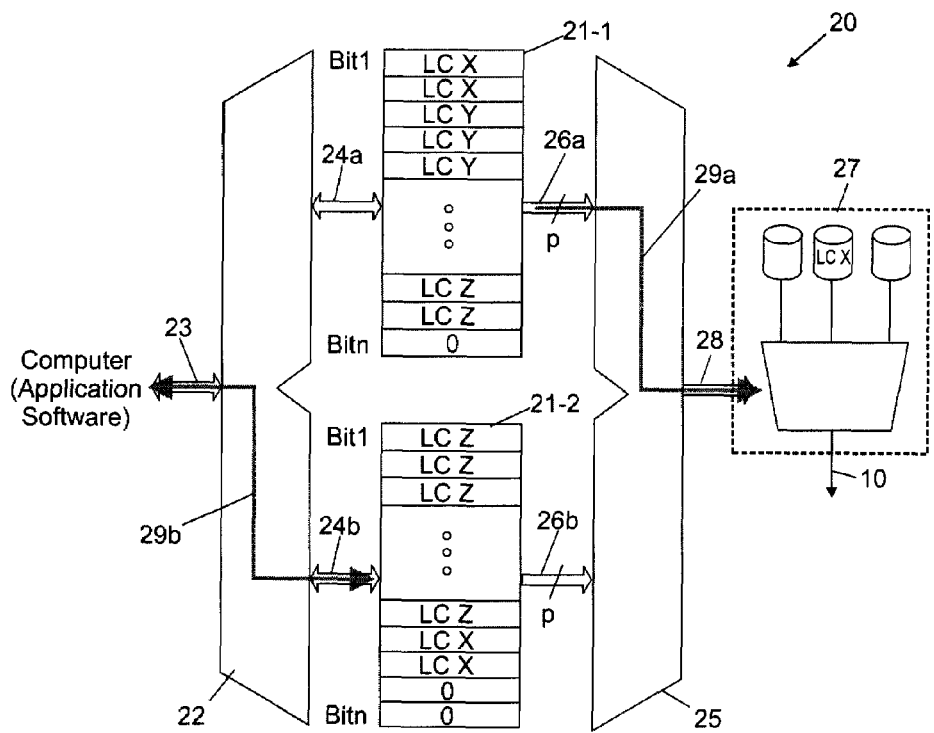
FIG. 2 shows a conventional dynamic time division multiplexing circuit to dynamically provide a time slot assignment that is comprised of two memory blocks to store the active and shadow TSA tables, a demultiplexer fed by the application software stored in a computer and a multiplexer connected to the time slot assignor.

In practice, the flexibility offered by the conventional circuit of FIG. 2 is not needed in most applications. The only modifications which need to be applied in real time to the time slot assignment consist in the opening/creation or the closing/deletion of logical channels as exchanges between subsystems appear or disappear. Notwithstanding, this level of flexibility which is really required by some applications can be reached by the improved dynamic TDM circuit of the present invention. The memory block storing the shadow TSA table and the demultiplexer/multiplexer circuits are no longer required. Now, according to the present invention, only one memory block to store the TSA table, a register and a very simple logic circuitry need to be implemented in hardware. A specific initialization and update procedure adapted to said improved dynamic TDM circuit will be also described herein below.

Figure 3:
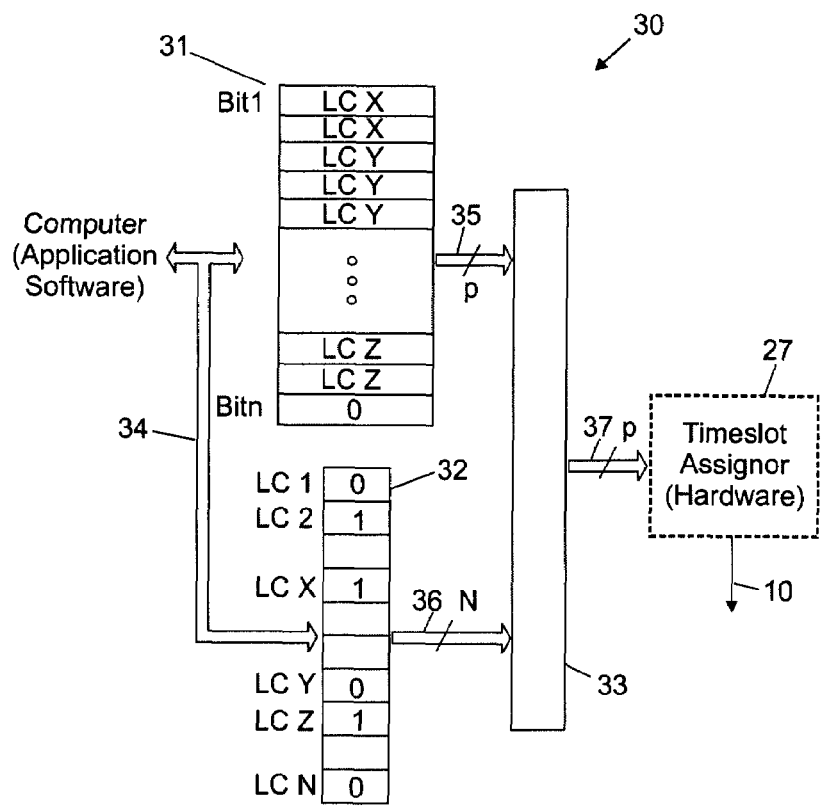
FIG. 3 shows the improved dynamic time division multiplexing circuit according to the present invention wherein the memory block storing the shadow TSA table is no longer required, a simple register being used instead for significant memory space saving.

Considering FIG. 3, the improved dynamic TDM circuit referenced 30 now consists of a single memory block 31 (typically a SRAM) to store the TSA table records, a register 32 and a logic circuit 33. The memory block 31 still has n memory fields referenced Bit1 to Bitn, assuming n-bit TDM frames are processed, to store the logical channel identifiers still coded on p bits. The role of register 32 is to store one "status" bit per logical channel. Assuming that the maximum number of logical channels that can be simultaneously opened is represented by N, register 32 thus has N fields to store the status bits with a granularity of one bit. These fields are referenced LC 1 to LC N in FIG. 3, i.e., by the logical channel identifier associated thereto for the sake of simplicity. Using the same assumptions as described above, the memory space that is now required is only 1024×8 bits (in memory block 31) and 256×1 bits (in register 32) ensuring thereby a significant memory space saving as a whole. This advantage increases as the transmission rate increases. When a TSA table record specifies a logical channel identifier for which the status bit in the register 32 associated thereto is "0", the corresponding data bit is considered as being not assigned to any logical channel. In this case, the computer can update this record without any impact for the time slot assignor. If the associated status bit in the register 32 equals "1", then the corresponding data bit is considered as being assigned to the logical channel specified in the TSA table record. The memory 31 and the register 32 are accessed by the application software stored in the computer via bi-directional bus 34. On the other hand, they are connected to logic circuit 33 via unidirectional buses 35 and 36 respectively. Logic circuit 33 is coupled to the time slot assignor via unidirectional bus 37.

As apparent in FIG. 3, as far as logical channel identifier LC X is concerned, the "1" that is associated therewith in register 32 indicates that this logical channel is assigned.

Assuming that improved TDM circuit 30 controls the transmission of data bits and that Bit1 is the current bit position, then 8 bits coding logical channel identifier LC X are sent to the time slot assignor, which in turn, will output the first data bit from the FIFO dedicated to store the data bits assigned to LC X. The same operation is repeated for Bit2, so that two data bits assigned to logical channel X will be transmitted on the common media 10 as the first time slot. The demultiplexer 22 and the multiplexer 25 of the FIG. 2 circuit are no longer required at the cost of logic circuit 33 which can be physically implemented very simply. In essence, logic circuit 33 propagates the logical channel identifier specified in the current TSA table record to the time slot assignor if its associated status bit is set to "1" in the register 32. The time slot assignor then knows from which FIFO the current data bit must be extracted. In contrast, if the associated status bit is set to "0" in the register 32, the logic circuit 33 propagates a null logical channel identifier which means "unassigned". In this case, a default value is sent in lieu of a data bit, which is recognized by the receiver (in case of a transmission). Assigning a data bit to a deactivated channel is like unassigning it.

Figure 4:
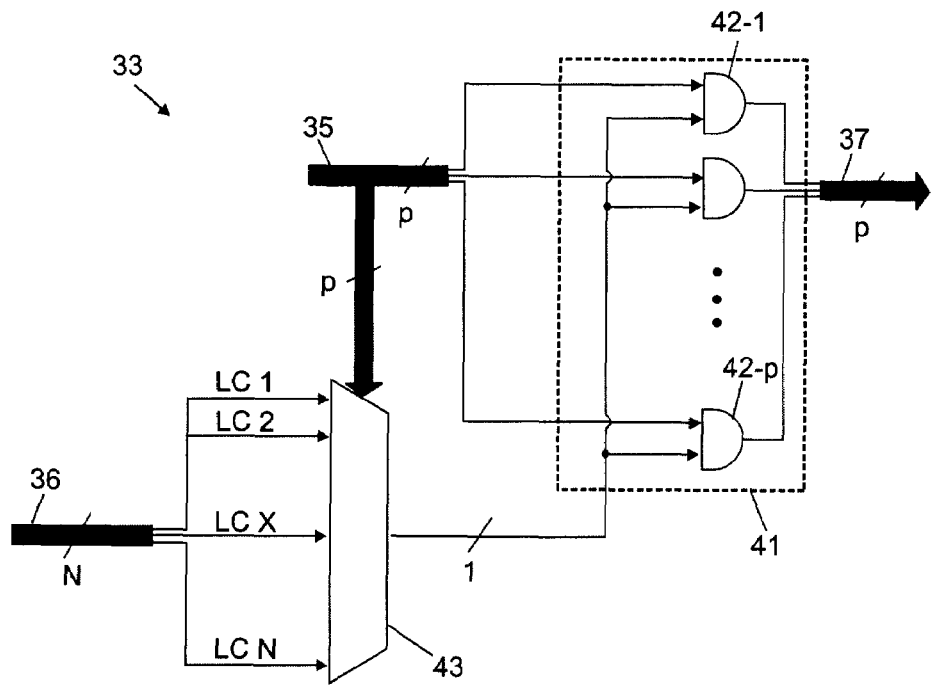
FIG. 4 schematically shows a typical implementation of the logic circuit illustrated in FIG. 3.

FIG. 4 is a schematic implementation of the logic circuit 33 shown in FIG. 3. In FIG. 4, logic circuit 33 basically consists of a logic block 41 made of p two-way AND gates 42-1 to 42-p and a N-input selector 43. Selector 43 receives the N bits stored in register 32 as inputs via bus 36 and is controlled by the p bits of bus 35 to select one among said N inputs. Each of the p bits of bus 35 are also applied to one input of AND gates 42-1 to 42-p which receive the bit generated by the selector 43 on their other input. The p bits output by AND gates 42-1 to 42-p are bundled to form bus 37.

Operation of logic circuit 33 can be understood as follows. The TSA table stored in memory block 31 is read in sequence from the first field (Bit1) to the last one (Bitn) under the control of a specific serial clock. This operation is performed cyclically. Let us assume for example that the first TSA table record, i.e., LC X, is read. This p-bit binary word becomes available on bus 35, and each one of the p bits is applied on the first input of AND gates 42-1 to 42-p. Simultaneously, once decoded internally in selector 43, this binary word also selects the associated status bit at field LC X, which in the example depicted in FIG. 3 is equal to "1". This value is applied to each second input of said AND gates, enabling them to transmit said first record LC X to the time slot assignor via bus 37. If the associated status bit stored in register 32 would have been a "0" instead of a "1" (see for instance LC Y), the TSA table record would not have been sent to the time slot assignor, because the AND gates would have been disabled.

Figure 5:
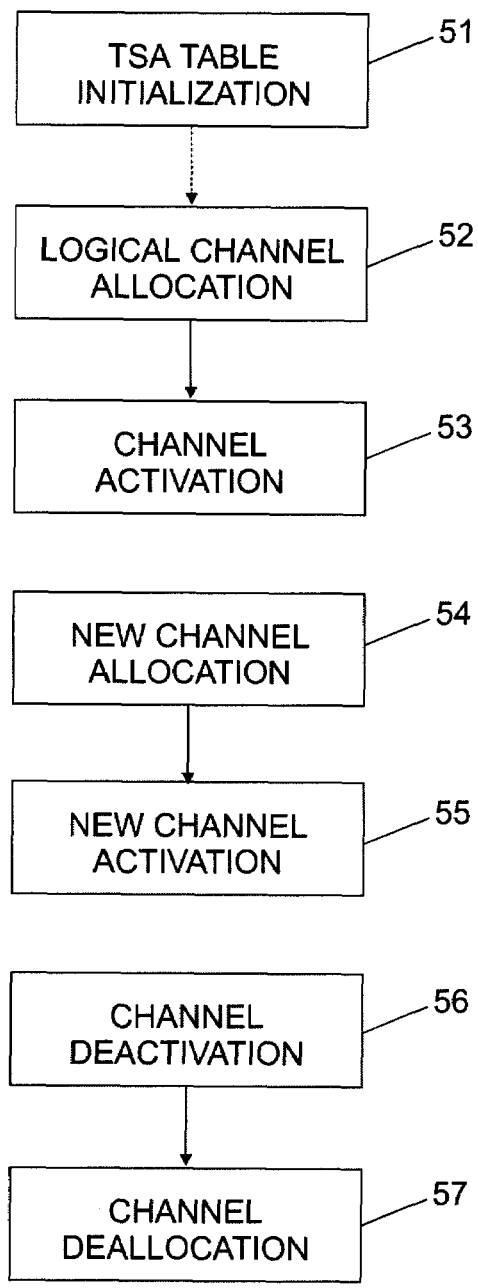
FIG. 5 shows the different steps to make the FIG. 3 circuit operative and for its update (opening/closing of a new logical channel, . . . ).

The essential steps of the procedure to update the TSA table stored in memory block 31 and the status bit held in register 32 shown in FIG. 3 will be now described in details by reference to FIG. 5. Now turning to FIG. 5, before any TSA table updating is performed, a preliminary step of initialization is required (box 51). TSA table initialization (51) After a global RESET operation, performed for instance at the chip level, register 32 is set to all-zeroes, so that all the logical channels are deactivated. This means that whatever the content of the TSA table, all the data bits are considered as being assigned to none logical channel, i.e. unassigned, and the common media 10 is continuously driven to a default value. At that time, the application software initializes all the fields of the TSA table to zero if this has not already been done by the RESET operation.

Let us assume now that we want to open a new logical channel/connection, two steps are then necessary, one to allocate bits to that logical channel (box 52) and the other to activate it (box 53).

Channel allocation (52) When the application software stored in the computer wishes to open a new logical channel, for example logical channel X bearing identifier LC X, first of all, it needs to allocate data bits to this logical channel. To that end, it makes sure that logical channel X is deactivated via its associated status bit held in register 32. Then, it updates the appropriate number of unassigned TSA table records to now refer to logical channel X, by setting fields in memory block 31 to its identifier LC X. This modification can be done dynamically because assigning a data bit to a deactivated channel is like unassigning the data bit. So, although this operation changes the memory block 31 content, the time slot assignment seen by the time slot assignor appears unchanged.

Channel activation (53): When the application software decides to activate logical channel LC X, it enables it by setting to one its associated status bit in register 32. The time slot assignor then detects that data bits are assigned to an activated logical channel and consequently determines the data bits of the corresponding time slot as belonging to LC X. The atomic nature of this channel activation (i.e. indivisible and very brief), makes the whole operation (allocation and activation) to also appear atomic for the time slot assignor even if several memory accesses were required to open this new logical channel.

Let us assume now that after logical channel X has been opened as described above, it is needed to create a new connection. This operation is performed through the steps of new channel allocation (box 54) and new channel activation (box 55).

New channel allocation (54): When the software needs to open a new logical channel, for example logical channel LC Y, it first makes sure that LC Y is deactivated via register 32. Then, it updates unassigned TSA table records to refer to LC Y. This operation has no effect on the already assigned ones, so that the active LC X is not impacted. This modification can be done dynamically because, as said above, assigning a data bit to a deactivated channel is like unassigning it. Therefore, although this operation changes the content of memory block 31, the time slot assignment seen by the time slot assignor appears unchanged.

New channel activation (55): After the new channel allocation step has been completed, the application software activates the new logical channel, Y in the present case, via the register 32. This causes the time slot assignor to determine the data bits of that time slot as belonging to LC Y to start driving the common media 10. Again, in view of the atomic nature of this channel activation, the whole operation (allocation and activation) also appears atomic for the time slot assignor even if several memory accesses were required to open this new logical channel. The last case to be studied consists in the closing operation to delete a connection while other (s) are let operative. Sill in this case, two steps are necessary to deactivate the logical channel corresponding to that connection (56) and deallocate this logical channel (57).

Channel deactivation (56): When the application software decides that a logical channel, X in this example, is no longer needed and should be closed, it deactivates LC X via register 32. Since that time, all the corresponding TSA table records which refer to LC X are simultaneously seen as being unassigned (atomic operation). The time slot assignor consequently determines the data bits of the time slot as being unassigned. In the transmission mode, the time slot assignor drives the default value in the common media 10 during the corresponding time slot, while in the reception mode the data bits are ignored.

Channel deallocation (57): Once the logical channel is deactivated, which is checkable via register 32, the application software can free the corresponding data bits by setting their logical channel identifier fields to zero. This modification can be done dynamically because, as said above, unassigning a data bit is like assigning it to a deactivated channel. Therefore, although this operation changes the content of memory block 31, the time slot assignment seen by the time slot assignor appears unchanged. In summary, although there is only one TSA table instead of two, usually referred to as the active and shadow tables, the application software can dynamically change the time slot assignment, in particular, it can open or close connections while other ones are running. The opening/closing operations appear also as being atomic for the time slot assignor despite they required several memory accesses for the application software. This leads to big savings in term of memory cell count as the shadow TSA table may be very large, as its size depends of both the length n of the TDM frame and the number p of bits necessary to code the number N. The latter is the maximum number of logical channels that can be simultaneously opened. The only constraint is that register 32 must contain the status (activated/deactivated) of all the logical channels and to implement a very simple logic circuit to propagate or not the logical channel identifier.

While the invention has been particularly described with respect to a preferred embodiment thereof it should be understood by one skilled in the art that the foregoing and other changes in form and details may be made therein without departing from the spirit and scope of the invention.

What is claimed is:

1. A method for providing logical channel identifier information to a time slot assignor in a dynamic time division multiplexing process, said method comprising:

splitting time into time slots, each slot corresponding to one among N logical channels, wherein N is a maximum number of logical channels that can be simultaneously opened in said process, storing in an N×p memory block time slot assignment (TSA) table at least one identifier (LC X) associated with logical channel (X), each said identifier being coded on p bits, specifying each bit position of an n-bit TDM frame that is assigned to said logical channel, storing status bits a register having N fields with a granularity of one bit, each bit indicating the status of a corresponding identifier in said TSA table, and transmitting said at least one identifier from said TSA table to a time slot assignor, wherein said transmission is controlled by a logic circuit receiving data from said resister as an input thereto.

* * * * *